United States Patent

Beyer et al.

[11] Patent Number: 5,277,482
[45] Date of Patent: Jan. 11, 1994

[54] ANTILOCK BRAKING SYSTEM

[75] Inventors: Claus Beyer, Schwieberdingen; Peter Dominke, Bietigheim-Bissingen, both of Fed. Rep. of Germany

[73] Assignee: Robert Bosch GmbH, Stuttgart, Fed. Rep. of Germany

[21] Appl. No.: 691,013

[22] PCT Filed: Nov. 11, 1989

[86] PCT No.: PCT/EP89/01351

§ 371 Date: Jun. 14, 1991

§ 102(e) Date: Jun. 14, 1991

[87] PCT Pub. No.: WO90/06872

PCT Pub. Date: Jun. 28, 1990

[30] Foreign Application Priority Data

Dec. 14, 1988 [DE] Fed. Rep. of Germany ....... 3841958

[51] Int. Cl.$^5$ ................................................. B60T 8/10
[52] U.S. Cl. .................................... 303/92; 303/100; 303/111; 364/426.02
[58] Field of Search .............. 303/100, 102, 103, 107, 303/109, 92; 364/426.01, 426.02

[56] References Cited

U.S. PATENT DOCUMENTS

| | | | |
|---|---|---|---|
| 3,609,313 | 9/1971 | Lucien | 303/100 X |
| 3,740,103 | 6/1973 | Sweet et al. | 303/100 |
| 3,953,080 | 4/1976 | Bromer | 303/106 X |
| 4,316,641 | 2/1982 | Weise et al. | 303/106 X |
| 4,841,446 | 6/1989 | Leiber et al. | 303/92 X |
| 4,955,671 | 9/1990 | Higashimura | 303/92 |

FOREIGN PATENT DOCUMENTS 2176557 12/1986 United Kingdom.

Primary Examiner—Robert J. Oberleitner
Assistant Examiner—Lee W. Young
Attorney, Agent, or Firm—Felfe & Lynch

[57] ABSTRACT

A reference speed signal approximating the vehicle speed is generated from the wheel speed signals. Wheel slippage signals are generated from the wheel speed signals and the reference speed signal, and used to produce control signals for brake pressure control devices at the wheels. The ABS is switched off when the vehicle is not braked and a wheel slippage signal exceeds a threshold for a predetermined period of time. In a preferred embodiment, the wheel slippage signal used for generating the control signal is reduced by a specified amount when the slippage signal exceeds a smaller threshold for a predetermined period of time.

6 Claims, 2 Drawing Sheets

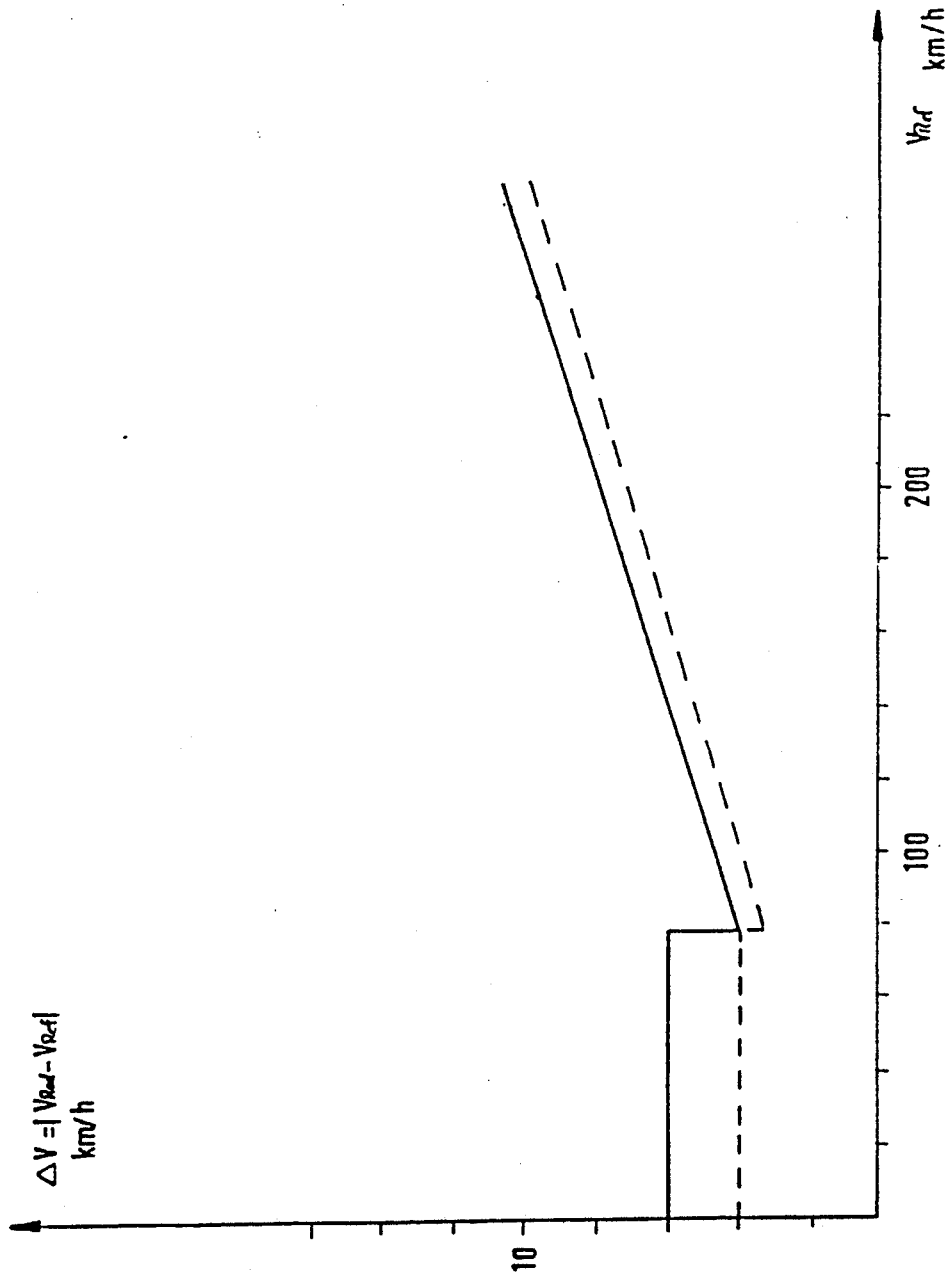

ANTILOCK BRAKING SYSTEM

BACKGROUND OF THE INVENTION

When a vehicle is driven using its spare wheel, or with widely varying tyre pressures, it is possible that the message given to the antilocking control system is an erroneous message of brake slip which either does not exist at all or is not to the extent indicated, which can lead to an unnecessary reduction of braking pressure, i.e. to insufficiently braked wheels.

SUMMARY OF THE INVENTION

Advantages of the Invention

The invention prevents such insufficient braking of the wheels by switching the controller off. Particular advantage is derived from linking the controller switch-off with a reduction of brake slip, which precedes the switch-off, by a specified value or increase of the threshold value with which the brake slip is compared, by a specified value.

The invention can be used in antilocking control systems in which the variable "brake slip" is compared with a threshold value and where, after exceeding the threshold, a signal for influencing the pressure is generated. In this case, the threshold value can be either increased, the determined slippage value can be reduced prior to the comparison, or the reference speed can be reduced. Using the brake slippage without comparing it directly with a threshold value (e.g. in accordance with DE-OS 36 14 770 or similar), allows only the three last mentioned methods of influencing.

BRIEF DESCRIPTION OF THE DRAWINGS

FIG. 2 shows an explanatory diagram

DETAILED DESCRIPTION OF THE PREFERRED EMBODIMENTS

Figure 1:
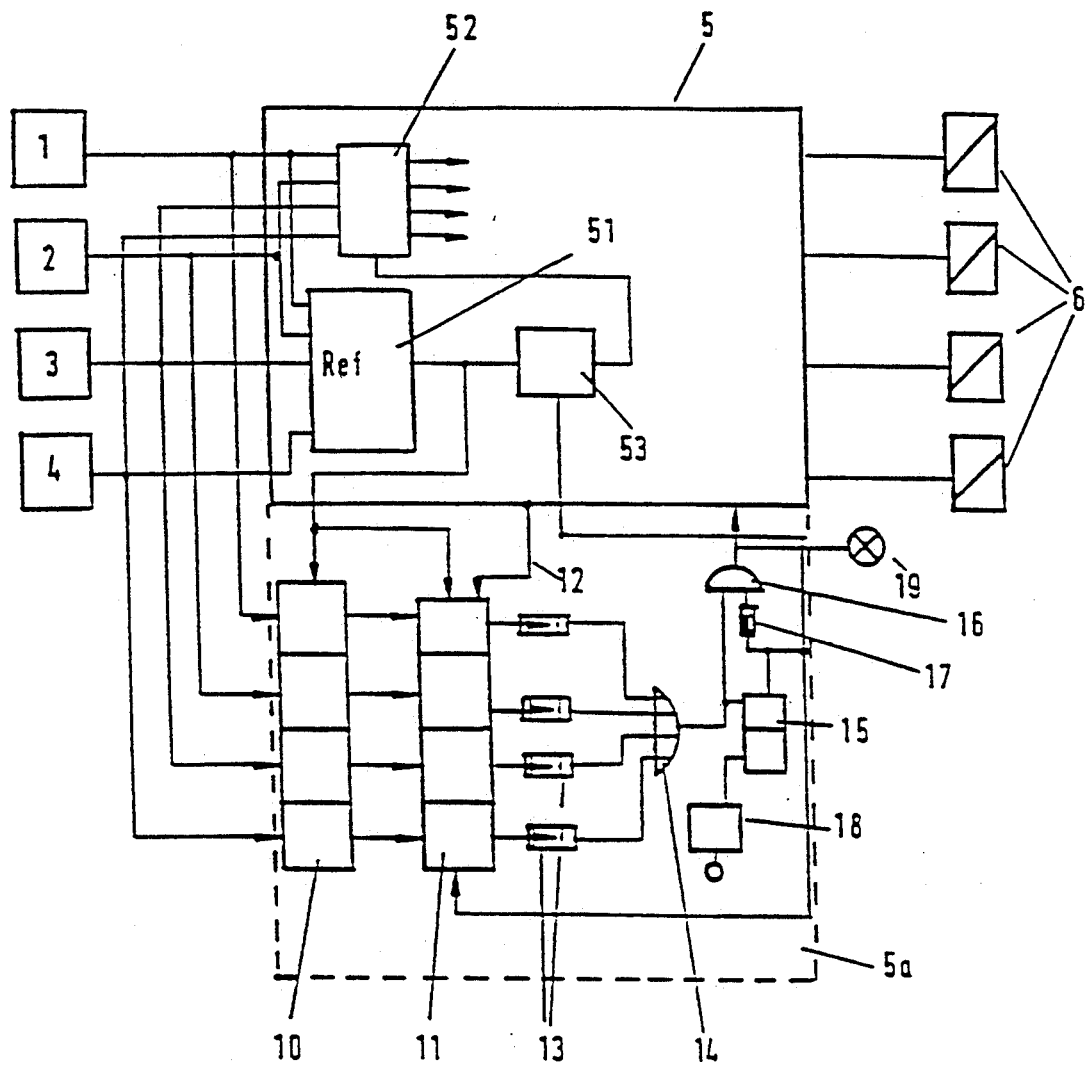
FIG. 1 shows a block diagram of an embodiment

In FIG. 1, the speed sensors 1-4 allocated to the wheels of the vehicle feed their signals to an evaluation circuit 5, which uses these signals to generate control signals for 3/3 solenoids 6. It is of no importance here as to how these control signals are generated. What is of importance for the invention, is the fact that slippage signals are formed and included in the control. To generate slippage signals, the evaluation circuit 5 includes a block 51 for the generally known development of a reference speed which approaches that of the vehicle, from the wheel speed signals, and a block 52 to generate slippage signals from the reference speed and the individual wheel speeds.

In part 5a of the evaluation circuit 5, slippage of the individual wheels is again developed in a block 10. The amounts of these slip values are evaluated in comparators 11, with specified values, which are speed related. For this purpose, the reference speed is fed to the comparators. In their first position, the comparators 11 emit a signal when a first threshold, shown in FIG. 2 as a dotted line, is exceeded by the slippage signal $\Delta V = |V_{Rad} - V_{Ref}|$. This threshold remains constant (e.g. 4 Km/h) up to 80 km/h, for example, and after that, it is a specified percentage (e.g. 3%) of the reference speed. The comparison is made in the comparators 11 only when the vehicle is not braked (line 12). If the specified threshold is exceeded for a period (e.g. 20 sec.) specified by the delay time elements 13, then a signal develops at the output of an OR gate 14 which sets a bistable element 15. This emits an output signal which firstly makes a higher second threshold effective in the comparators 11 (e.g. 6 km/h and 6% of the reference)—shown in FIG. 2 as a continuous line—and secondly, activates a block 53 in the evaluation circuit 5, which reduces the reference speed for the brake slip development of block 52 by a specified value (in km/h). The controller is thus made insensitive to brake slippage.

If the new second thresholds are also exceeded for a time (time function element 13), then a switch-off signal for the controller is emitted at the output of an AND gate 16, since the bistable element 15 is set when the new output signal of the OR gate 14 occurs. A time element 17 with a short delay time prevents the AND gate 16 from becoming conductive, and from switching off, as soon as the low threshold in the comparator 11 is exceeded. Reset of the bistable element 15 is by a block 18 which is supplied with the reference speed and which causes the reset when the O speed is reached.

The antilocking system of the invention recognizes, apart from braking, the presence of a spare wheel, for example, and switches over to a slip insensitive ABS operation, as long as the slippage thus developed is in an area between the first and second threshold, switching the controller off completely when the second threshold is also exceeded. This is indicated to the driver by a lamp 19.

We claim:

1. Antilocking control system for preventing locking of the wheels of a vehicle during braking, said system being of the type comprising wheel speed sensors which generate wheel speed signals for the respective wheels, brake pressure control devices assigned to the vehicle wheels, and an evaluation circuit which receives wheel speed signals from said sensors and produces control signals for said brake pressure control devices to prevent the wheels from locking, said evaluation circuit comprising means for generating a reference speed signal from the wheel speed signals, said reference signal approaching the speed of the vehicle,
   means for generating wheel slippage signals from the wheel speed signals and the reference speed signal,
   means for producing said control signals from said wheel slippage signals, and
   means for switching off the system when the vehicle is not braked and the wheel slippage signal exceeds a threshold value for a predetermined period of time while the vehicle is not braked.

2. Antilocking control system as in claim 1 wherein the threshold value is dependent on the reference speed signal.

3. Antilocking control system as in claim 2 wherein the threshold value is proportional to the reference speed signal.

4. Antilocking control system as in claim 2 wherein said threshold value is constant up to a specified reference speed and is dependent on the reference speed signal above said specified reference speed.

5. Antilocking control system as in claim 1 wherein said threshold value is a second threshold value, said evaluation circuit further comprising means for generating a first threshold value which is smaller than said second threshold value, and
   means for reducing the wheel slippage signals used for generating the control signals by a specified amount when said slippage signal exceeds said first threshold value for a predetermined period of time.

6. Antilocking control system as in claim 5 wherein the reference speed used to develop brake slippage is reduced by a specified value.

* * * * *